Patented Nov. 16, 1926.

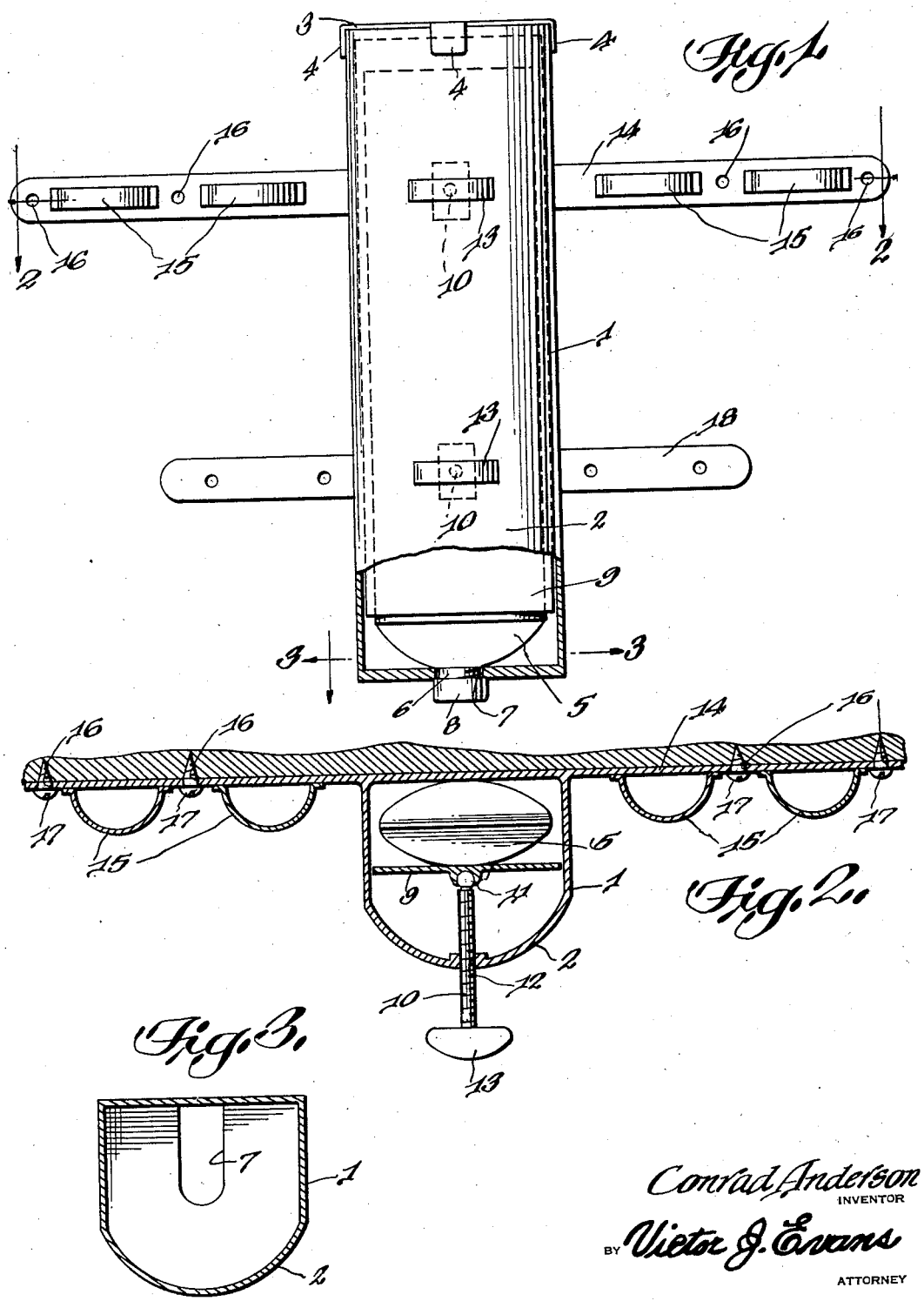

1,607,501

UNITED STATES PATENT OFFICE.

CONRAD ANDERSON, OF MUSKEGON, MICHIGAN.

COMBINATION HOLDER.

Application filed March 25, 1925. Serial No. 18,325.

This invention relates to a combination holder and more particularly to a device for supporting flexible tubes which are used for containing tooth paste and similar material for convenience of dispensing the contents of the tube, and the main object of my invention is the provision of a device of the above character whereby the tube containing the paste will be supported in an inverted position and enclosed within a suitable casing carrying means whereby the contents of the tube may be readily dispensed.

Another object of my invention is the provision of a support or holder of the above character, having in connection therewith suitable supporting elements for supporting, in close proximity to the dispensing device, tooth brushes and the like.

With the above and other objects in view, my invention consists in the novel features of construction and the combination and arrangement of parts to be hereinafter more fully described, pointed out in the claim and shown in the accompanying drawings, in which:

Fig. 1 is a front elevation of a device constructed in accordance with my invention, Fig. 2 is a sectional view taken on the line 2—2 of Figure 1, and Fig. 3 is a sectional view taken on the line 3—3 of Figure 1.

In carrying out my invention, I provide a substantially rectangular casing 1, the front wall of which is slightly arcuate in shape as shown at 2. One end of the casing is normally open and is adapted to be closed by means of a detachable cover plate 3, having spring tongues 4 arranged in spaced relation around the edge of the cover plate for yieldably gripping the exterior of the casing 1 for retaining the cover in position.

A tube 5, containing tooth paste, shaving cream or material of this character is adapted to be placed within the casing 1 in an inverted position as illustrated with the usual dispensing neck 6 passed through a slot 7 formed in the closed end of the casing. The neck 6 is threaded as is usually the case with tubes of this character which are of the collapsible type and has a cap 8 normally closing the open end of the neck, said cap to be removed while the neck is passed through the slot 7 and then replaced when the device is not in use.

In order to force the contents of the tube 5 therefrom, a pressure plate 9 is arranged within the casing and has connected thereto the threaded rods 10. The inner ends of the rods 10 are universally connected to the plate 9 by means of the ball and socket joint 11 and the rods are threaded through suitable openings 12 in the arcuate front wall 2 and have thumb buttons 13 upon their outer ends whereby the rods 10 may be adjusted in the openings 12 for moving the pressure plate 9 toward or away from the tube 5. In the present instance while I have shown two of the rods 10 in use, it may be found that one will be sufficient for carrying out the idea.

Extending laterally from opposite sides of the casing 1 are the upper supporting arms 14, to the outer faces of which are attached the loops 15 which are adapted to be used as supports for tooth brushes and similar articles. These loops are arranged in spaced relation on the arms 14 upon opposite sides of the casing and the arms are further provided with openings 16 whereby screws 17 may be passed therethrough for supporting the casing. Additional arms 18 are also extended from opposite sides of the casing and are arranged in spaced relation to the arms 14 for providing a thoroughly rigid support for the casing.

It will be noted from the foregoing that I have provided a simple and inexpensive article wherein collapsible tubes, such as are used for containing tooth paste, shaving cream and similar material may be always positioned ready for use and wherein the entire amount of material in the tube may be dispensed therefrom, thus eliminating waste. It will be noted that as the walls of the tube are brought together to force the entire contents of the tube therefrom, the slot 7 will permit the neck portion 6 to move inwardly toward the support upon which the device is mounted.

While I have shown and described the preferred form of my invention, it will be obvious that various changes in the details of construction and in the proportions may be resorted to for successfully carrying my invention into practice without sacrificing any of the novel features or departing from the scope of the appended claim.

Having thus described my invention, what I claim is:

In a device of the character described, a casing open at its upper end and provided with an opening in its lower end to accommodate the neck of a collapsible tube within the casing, a pressure plate mounted within the casing and spaced from the back wall thereof, the plate extending to within a short distance of the ends of the casing, pressure screws threaded through the front wall of the casing, and ball and socket connections between the inner ends of the screws and the plate adjacent the ends thereof whereby the screws may be adjusted independently of each other to dispose the plate at an inclination and vary the pressure applied at either end of the plate for expelling the contents of the tube positioned between the plate and the back wall of the casing.

In testimony whereof I affix my signature.

CONRAD ANDERSON.